United States Patent
Allerellie

(10) Patent No.: US 7,167,624 B2
(45) Date of Patent: Jan. 23, 2007

(54) FIBER OPTIC SPLICE CLOSURE

(76) Inventor: Michael W. Allerellie, 1014 Uhlhorn St., Evansville, Vanderburgh County, IN (US) 47710

( * ) Notice: Subject to any disclaimer, the term of this patent is extended or adjusted under 35 U.S.C. 154(b) by 0 days.

(21) Appl. No.: 11/120,851

(22) Filed: May 2, 2005

(65) Prior Publication Data

US 2005/0244128 A1    Nov. 3, 2005

Related U.S. Application Data

(60) Provisional application No. 60/567,166, filed on May 3, 2004.

(51) Int. Cl.
*G02B 6/00* (2006.01)
*G02B 6/46* (2006.01)

(52) U.S. Cl. ...................................... 385/135

(58) Field of Classification Search ......... 385/134–137
See application file for complete search history.

(56) References Cited

U.S. PATENT DOCUMENTS 6,484,958 B1 *  11/2002  Xue et al. ................ 242/378.1
6,915,058 B1 *   7/2005  Pons ......................... 385/135

* cited by examiner

*Primary Examiner*—Michelle Connelly-Cushwa
(74) *Attorney, Agent, or Firm*—Gary K. Price, Esq.

(57) ABSTRACT

A fiber optic splice closure designed to prevent undesired bending of optical fiber cables within the closure. The closure is generally formed of a lower base section and an upper body section that form a tight, water-resistant seal along their interface. The cross-section shape of the closure of the present invention is generally round. The lower base section includes an interior having a surface wall and an interior wall that define a slack storage area. As such, the slack storage area defined within the closure likewise has a round configuration to thereby avoid excessive bending or kinking of the un-spliced fiber positioned within the slack storage area. The fiber optic splice closure further includes a fastening means centrally disposed through the lower base and upper body sections that form a tight, water-resistant seal therebetween.

20 Claims, 4 Drawing Sheets

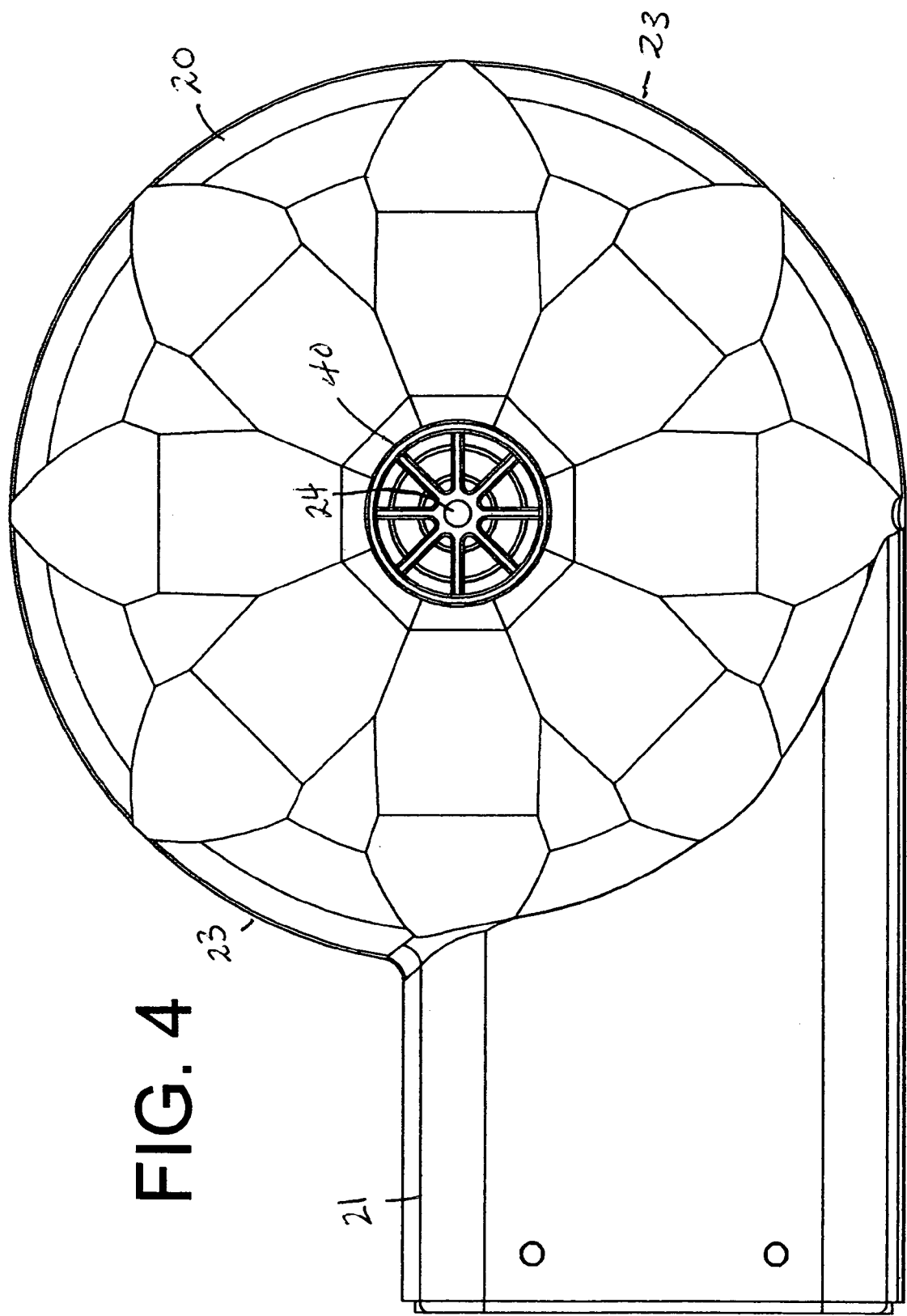

FIBER OPTIC SPLICE CLOSURE

CROSS REFERENCES TO RELATED APPLICATIONS

U.S. Provisional Application for Patent No. 60/567,166, filed May 3, 2004, with title "Fiber Optic Splice Closure" which is hereby incorporated by reference. Applicant claims priority pursuant to 35 U.S.C. Par. 119(e)(i).

Statement as to rights to inventions made under federally sponsored research and development:

Not Applicable

BACKGROUND OF THE INVENTION

1. Field of the Invention

The present invention relates generally to the field of fiber optics and, more particularly, to a fiber optic splice closure having a round configuration that provides physical protection and storage for cables such as those used in telecommunications.

2. Brief Description of Prior Art

Optical fiber communications systems, employing fiber optic cables are widely used in the telecommunication industry to transmit large volumes of data and voice signals. Splice points and drop points for the fiber optic cables are required for most such systems. At a splice point, for example, all of the fibers at one end of a cable are spliced to corresponding fibers of a tandem cable.

For both splice points and drop points, the optical fibers are exposed from the protective cable jacket to be spliced and secured within a splice closure. The splice closure typically includes a protective housing with one or more splice organizers, or splice trays, disposed in stacked arrangement within the protective housing. The cables generally extend into the housing and are secured therein.

The typical fiber optic closure further includes a storage tray adjacent the stacked splice trays. A typical storage tray is generally rectangular and includes a base and a pair of opposing upwardly extending walls from the base. A large number of fibers are passed through the closure and positioned in the storage tray without being spliced. Unfortunately, optical fiber positioned within a conventional storage tray may be bent in any direction in order to be stored in the storage tray thereby increasing attenuation and possibly physically damaging the fiber. Accordingly, the prior art closure having a conventional-shaped storage tray is unacceptable for use with optical fiber cables.

As will be seen from the subsequent description, the preferred embodiments of the present invention overcome shortcomings of the prior art.

SUMMARY OF THE INVENTION

The present invention is a fiber optic splice closure designed to prevent undesired bending of optical fiber cables within the closure. The closure is generally formed of a lower base section and an upper body section that form a tight, water-resistant seal along their interface. The cross-section shape of the closure of the present invention is generally round. As such, a slack storage area defined within the closure likewise has a round configuration to thereby avoid excessive bending or kinking of the un-spliced fiber positioned within the slack storage area. The storage area of this configuration provides additional storage capacity for fibers that are not spliced, but rather simply pass through the splice closure and stored as slack.

The fiber optic closure of the present invention further includes a fastening means centrally disposed through the lower base and upper body sections that form a tight, water-resistant seal therebetween.

BRIEF DESCRIPTION OF THE DRAWINGS

FIG. 4 is a top perspective view of the outer surface of a body section of the closure of FIG. 1.

DESCRIPTION OF THE PREFERRED EMBODIMENT

Figure 1:
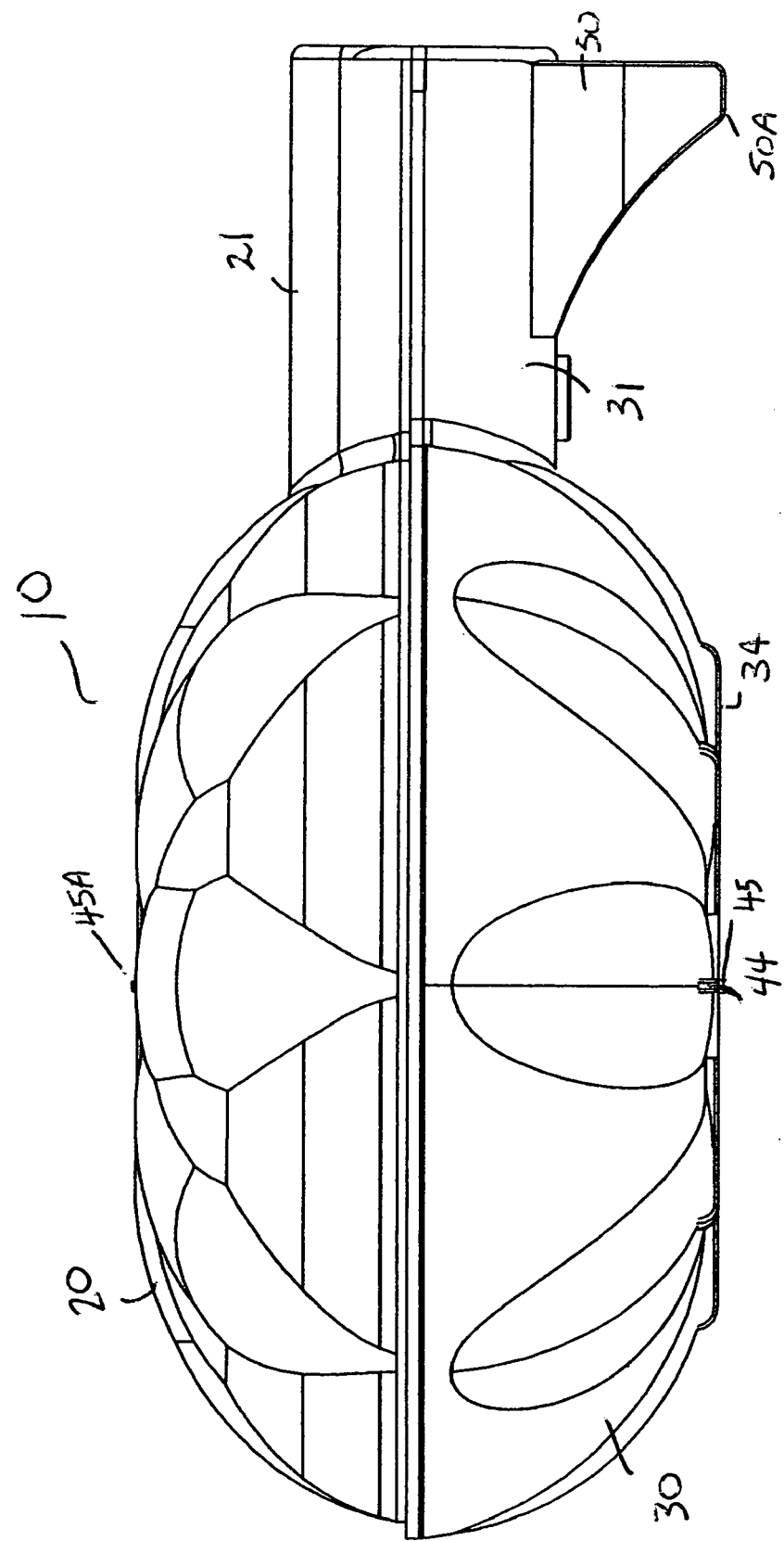
FIG. 1 is a side view of a preferred embodiment of the present invention, a fiber optic splice closure having a generally round configuration.
Figure 2:
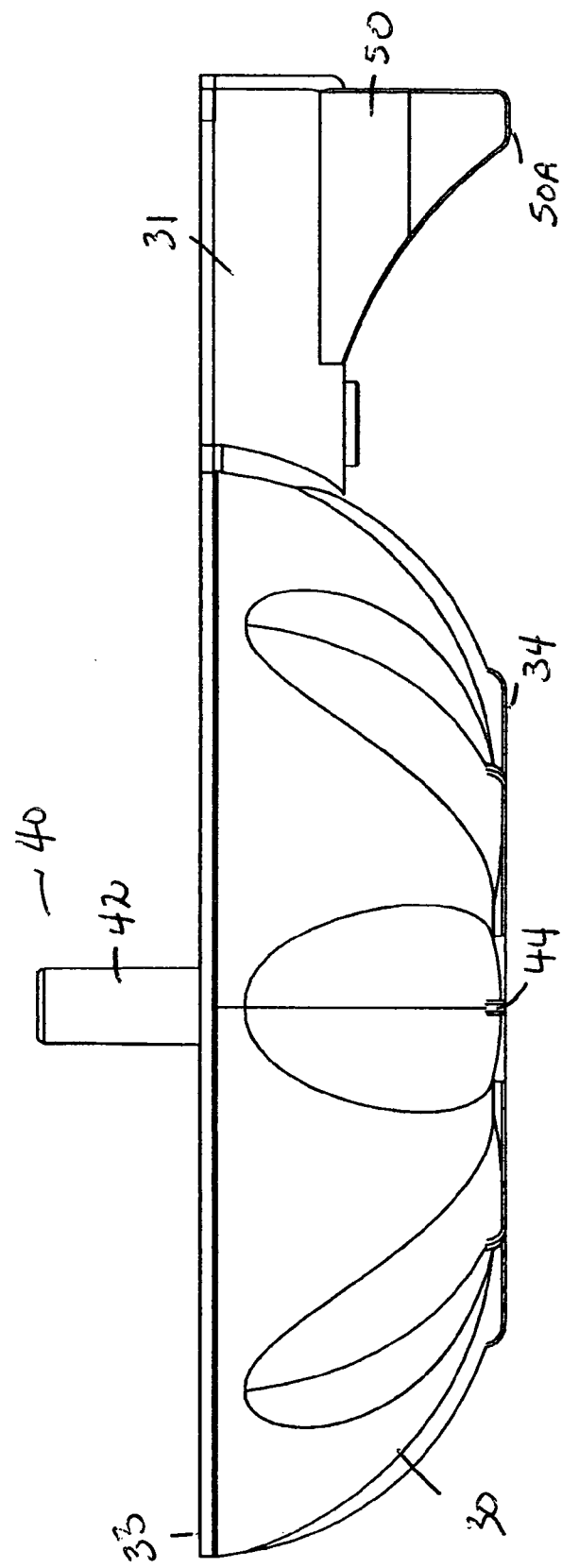
FIG. 2 is a side view of a base section of the closure of FIG. 1.

In accordance with the present invention, a fiber optic splice closure is disclosed. The splice closure of the present invention is designed to prevent undesired bending of optical fiber cables stored within the closure. The closure is designed so that fiber within the closure is maintained with a minimum bend radius. Specifically, it will be noted in the drawings that the fiber optic splice closure prevents fiber within the closure from kinking thereby increasing attenuation and possibly physically damaging the fiber. In the broadest context, the closure of the present invention consists of components configured and correlated with respect to each other so as to attain the desired objective.

FIGS. 1–4 illustrate a preferred embodiment of a fiber optic splice closure 10 made in accordance of the present invention. The closure 10 is generally comprised of an upper body section 20 and a lower base section 30 that form a protective housing for the closure's inner framework. The upper body section 20 and lower base section 30 each include upper and lower ends 21, 31 respectively, that seal along their interface. The upper end 21 is preferably integrally formed with the upper body section 20, and the lower end 31 is preferably integrally formed with the lower base section 30. As is known in the art, one or more fiber optic cables (not shown) enter the closure 10 through suitable openings in the ends 21, 31 and are carried to respective splice trays (not shown) that are disposed within the closure 10. Application of the spice trays within the closure 10 are known in the art.

An important feature of the present invention is the cross-section shape of the closure 10 is generally round, with the end portions 21, 31 extending therefrom. This is distinct from prior art closures having an oval or dome-like configuration. Unfortunately, optical fiber positioned within a conventional closure having such a configuration may be bent in any direction in order to be stored therein, thereby increasing attenuation and possibly physically damaging the fiber. Accordingly, the prior art closure having a conventional-shaped storage tray is unacceptable for use with optical fiber cables. As will be discussed the round configuration of the present invention maintains the fibers with a minimum bend radius and avoids the fiber from bending and kinking as with the prior art.

The closure 10 may be formed of any durable material, preferably a thermoplastic (injection-moldable) polymer such as polypropylene. As will be further discussed, another important feature of the present invention is the closure 10 includes fastening means 40 centrally disposed through the lower base section 30 and the upper body section 20 of the closure 10 that form a tight, water-resistant seal therebetween.

Figure 3:
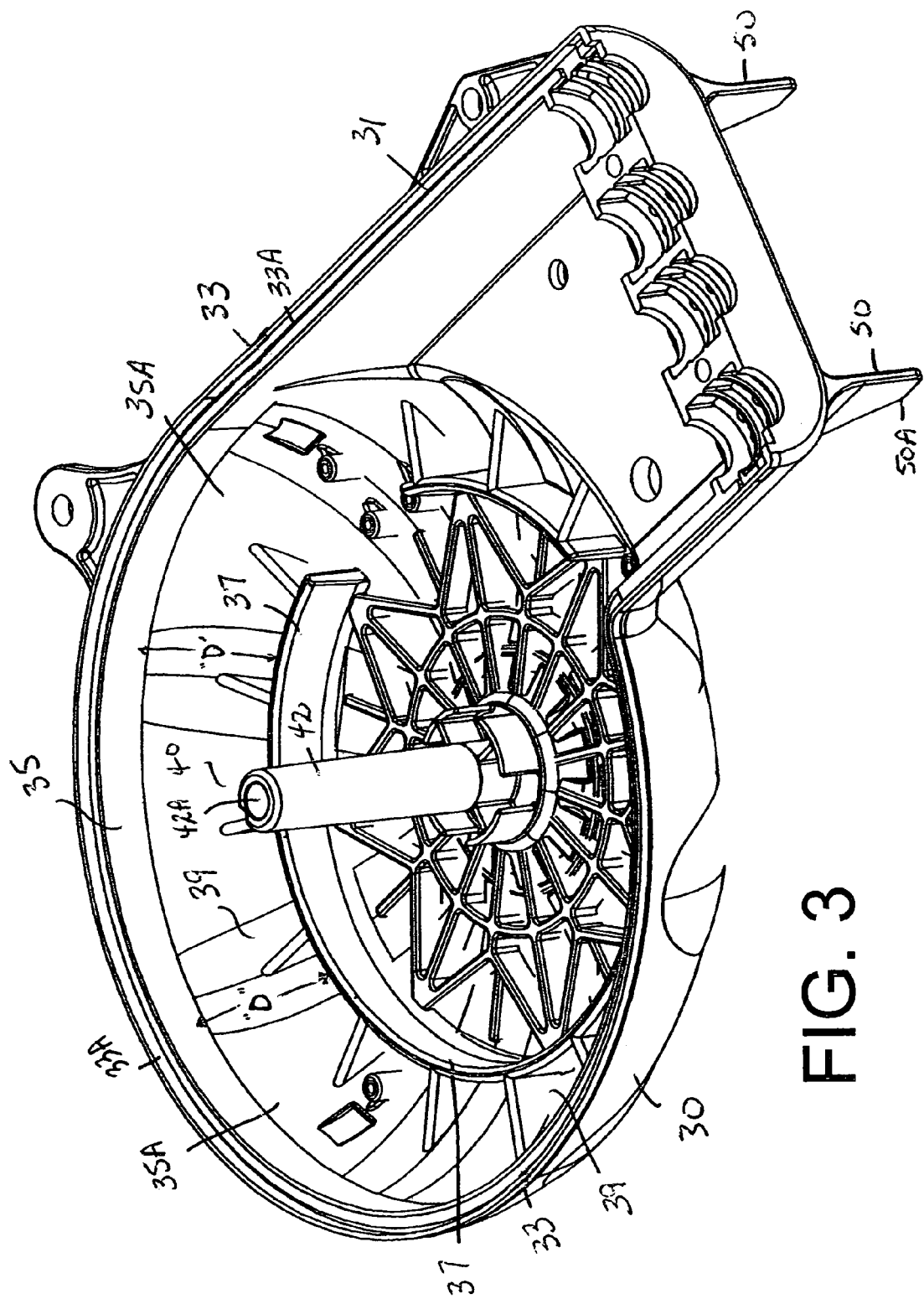
FIG. 3 is a top perspective view of the interior surface of the base portion of FIG. 2.

Referring to FIG. 3, the lower base section 30 includes an interior surface 35. Access to the interior 35 of the closure 10 is provided by releasing the fastening means 40 and removing the upper body section 20 from the lower base section 30.

The base section 30 includes a base-edge 33 that extends the upper perimeter of the base section 30. The base edge 33 includes a notch 33A sized to receive an edge 23 (shown in FIG. 4) of the body section 20. The edge 23 likewise extends the perimeter of the body section 20. In application, when connecting the base section 30 and body section 20, a gel or gasket (not shown) known in the art can be applied to the edge 33 of the base section 30 so that when the body section 20 is positioned on the base section 30, the edges 33, 23 form a seal along their interface. Application of the fastening means 40 forms a tight, water-resistant seal therebetween.

The interior surface 35 includes an interior wall 37 disposed a distance "D" (shown in FIG. 3.) in parallel relationship from a surface wall 35A of the interior surface 35. The walls 35A, 37 and interior surface 35 defining a slack storage area 39 that extends the outer boundary of the interior surface 35. Thus, the walls 35A, 37 defining the slack storage area 39 follow the corresponding round configuration of the interior surface 35 of the base section 30 and, therefore, provide an enlarged slack storage capacity with a minimum bend radius.

The interior surface 35 further includes a hollow stem 42 that extends upwardly from the approximate center of the base section 30. The stem 42 having a bore 42A that extends the length of the stem 42. An aperture 44 (shown in FIG. 1) is disposed in the exterior surface of the base section 30, the aperture 44 is in alignment and communication with the bore 42A. The aperture 44 and bore 42A are sized to receive a standard bolt 45.

The exterior surface of the body section 20 includes an aperture 24 disposed so that when the body section 20 is positioned on the base section 30, the aperture 24 is in alignment with the bore 42A and aperture 44.

The fastening means 40 further includes a nut 45A that threadably engages the bolt 45. In application, the body section 20 is connected to the base section 30 as discussed above by positioning the body section 20 on the base section 30 so that the edges 23, 33 are in sealing communication, passing the bolt 45 through the aperture 44, bore 42A, and aperture 24, and securing the sections 20, 30 together with the nut 45A.

As should be understood, with the fastening means 40 centrally positioned with respect to the base sections 20, 30 of the closure 10, pressure is evenly applied to the area where the sections 20, 30 interface.

As best shown in FIG. 3, at least one fin 50 extends from a lower surface 31A of the lower end 31. In particular, the fin 50 downwardly extends in perpendicular relationship to the end 31. As illustrated in the drawings, each of the at least one fins 50 include an end portion 50A that is on an axis with a bottom surface 34 of the base section 30. As a result, the at least one fin 50 prevents the base section 30, and closure 10 from tilting when resting on a surface.

As stated, the cross-section shape of the closure 10 of the present invention is generally round. As such, the slack storage area 39 defined within the closure 10 likewise has a round configuration. In application, un-spliced fiber can be stored within the slack storage area 39 of the closure 10. The round configuration of the slack storage area 39 maintains the fibers stored therein with a minimum bend radius. This configuration will allow the fibers to be stored in its non-tension state and thereby avoids excessive bending or kinking of the un-spliced fiber positioned within the storage area 39. The slack storage area 39 of this configuration further provides additional storage capacity for fibers that are not spliced, but rather simply pass through the splice closure and stored as slack.

Although the description above contains many specificities, these should not be construed as limiting the scope of the invention but as merely providing illustrations of some of the presently preferred embodiments of the invention. It will be obvious that embodiments described may be varied in many ways. Such variations are not to be regarded as a departure from the spirit and scope of the invention, and all such modifications as would be obvious to one skilled in the art are intended to be included within the scope of the present invention.

Thus the scope of the invention should be determined by the appended claims and their legal equivalents, rather than by the examples given.

I claim:

1. A fiber optic splice closure comprising:
   an upper body section having an upper end,
   a lower base section having a lower end,
   the upper body section and lower base section forming a protective housing,
   the lower base section further including an interior, said interior including a surface wall and an interior wall that define a slack storage area, a hollow stem centrally disposed within the interior that upwardly extends from the center of the interior of the base section, said hollow stem having a bore therethrough,
   a base-aperture centrally disposed in the base section,
   a body-aperture centrally disposed in the body section,
   at least one fin that extends from a lower end of the base section, said at least one fin downwardly extends perpendicular to the lower end so that an end of the fin is on an axis with a bottom surface of the base section,
   wherein the body-aperture, base-aperture and bore are in alignment,
   fastening means for releasably connecting the upper body section to the lower base section,
   wherein the cross-section shape of the protective housing is generally round, and
   wherein the cross-section shape of the slack storage area is generally round.

2. The fiber optic splice closure as recited in claim 1, wherein the upper body section further includes a body-edge that extends the perimeter of the body section, and the lower base section further includes a base-edge that extends the perimeter of the base section, said body-edge is in sealing communication with said base-edge when said protective housing is formed.

3. The fiber optic splice closure as recited in claim 1, wherein said fastening means is a bolt that passes through the base-aperture, the bore, and the body-aperture and with a nut.

4. A housing for supporting a plurality of fiber optic cables and associated interconnection devices, comprising:
   a base defining a slack storage area for receiving excess fiber slack, said base further comprising a base edge that extends the perimeter of the base, a hollow stem that extends upwardly from the approximate center of the base, a base aperture in alignment with said hollow stem, and a lower end that extends from the base, said lower end including an opening for receiving said cables, an upper section having an upper edge that extends the perimeter of the upper section, an upper section aperture in alignment with said hollow stem, and an upper end that extends from the upper section, said upper end including an opening for receiving said cables, wherein the lower end further includes at least one fin that extends from a lower surface of the lower end, said fin includes an end portion that is on an axis with a bottom surface of said base, wherein said base edge receives said upper edge in sealing relation, fastening means to sealingly attach said base to said upper section, and wherein the cross-section shape of the housing is round.

5. The housing as recited in claim 4, wherein the base edge includes a notch portion for receiving said upper edge.

6. The housing as recited in claim 4, wherein the lower end is integrally formed with said base, and said upper end is integrally formed with said upper section.

7. The housing as recited in claim 4, wherein the upper and lower ends form a seal along their interface.

8. The housing as recited in claim 4, wherein the hollow stem further comprising a bore that extends the length of the stem, wherein the bore of the stem is in alignment with said upper section aperture and said base aperture.

9. The housing as recited in claim 8, wherein the bore of the stem, said upper section aperture, and said base aperture are sized to receive said fastening means.

10. The housing as recited in claim 4, wherein the base further comprising an interior surface having a surface wall and an interior wall disposed a distance from said surface wall, wherein said interior surface, said surface wall, and said interior wail define said slack storage area.

11. The housing as recited in claim 10, wherein the surface wall and the interior wall follow the corresponding round configuration of the base.

12. The housing as recited in claim 4, wherein the fastening means is a bolt and a nut.

13. The housing as recited in claim 4, wherein said fastening means is centrally positioned with respect to the base and the upper section such that pressure is evenly applied when the base and upper section interface.

14. A fiber optic closure comprising:
a body having an upper portion and a lower portion,
fastening means for releasably securing said upper portion to said lower portion, said fastening means is centrally positioned with respect to the body,
a lower end extending from said lower portion, said lower end including a port for receiving at least one fiber optic cable,
an upper end extending from said upper portion, said upper end including a port for receiving said at least one cable,
wherein said lower end further includes at least one fin that extends from a lower surface of the lower end, said fin includes an end portion that is on an axis with a bottom surface of the lower portion,
wherein said lower portion including a slack storage area for receiving excess cable slack, and
wherein the cross-section shape of the body is round.

15. The fiber optic closure as recited in claim 14, wherein said upper portion includes an upper edge that extends the perimeter of the upper portion, and wherein said lower portion includes a base edge that extends the perimeter of the lower portion, said base edge comprising a notch sized to receive said upper edge.

16. The fiber optice closure as recited in claim 15, wherein the upper and lower portions form a seal along their interface.

17. The fiber optic closure as recited in claim 14, wherein the fastening means is a bolt and a nut.

18. The fiber optic closure as recited in claim 17, wherein the body further includes a hollow stem that extends upwardly from the approximate center of the base portion, said hollow stem comprising a bore that extends the length of the stem, wherein the bore of the stem is in alignment with an upper aperture centrally disposed in the upper portion, said bore is further aligned with a lower aperture centrally disposed in the lower portion, and wherein the bore, the upper aperture, and the lower aperture are sized to receive said bolt.

19. The fiber optic closure as recited in claim 14, wherein the slack storage area follows the corresponding round configuration of the body.

20. The fiber optic closure as recited in claim 14, wherein said fastening means is centrally positioned with respect to the body such that pressure is evenly applied where the upper and lower portions of the body interface.

* * * * *